United States Patent [19]
van der Lely

[11] 3,736,670
[45] June 5, 1973

[54] CROP DRIERS
[76] Inventor: Ary van der Lely, 10, Weverskade, Maasland, Netherlands
[22] Filed: June 7, 1971
[21] Appl. No.: 150,287

[30] Foreign Application Priority Data
June 11, 1970 Netherlands ....................7008488

[52] U.S. Cl. ..................34/218, 34/174, 34/216, 34/236, 209/238
[51] Int. Cl. ..............................................F26b 19/00
[58] Field of Search..............34/174, 168, 215–218, 34/236; 209/238, 308, 135, 11

[56] References Cited

UNITED STATES PATENTS

| | | | |
|---|---|---|---|
| 2,623,634 | 12/1952 | Kuss | 209/238 |
| 2,706,371 | 4/1955 | Bishop | 209/238 |
| 2,069,139 | 1/1937 | Flather | 209/308 |
| 2,501,487 | 3/1950 | Whitman | 34/174 |
| 2,974,797 | 3/1961 | Blackman | 209/308 |
| 2,975,898 | 3/1961 | Nelson | 209/238 |

FOREIGN PATENTS OR APPLICATIONS

| | | | |
|---|---|---|---|
| 325,301 | 3/1935 | Italy | 209/308 |

*Primary Examiner*—Kenneth W. Sprague
*Assistant Examiner*—James C. Yeung
*Attorney*—Mason, Mason & Albright

[57] ABSTRACT

A crop drier has an enclosed drying space and a heater which forces heated air through a lower air passage and into contact with crop being moved through the drying space. At the lower aspect of the passage, a debris collecting and cleaning device is positioned. The cleaning device can be displaced relative to the remainder of the drier for debris removal.

7 Claims, 4 Drawing Figures

INVENTOR
ARY VAN DER LELY

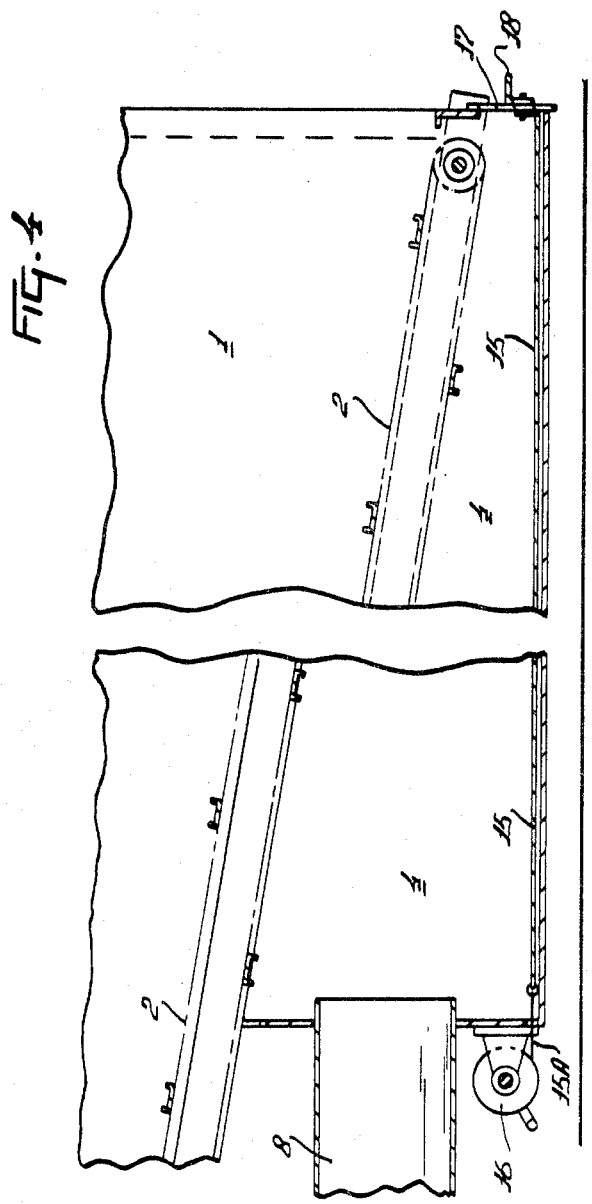

CROP DRIERS

For a better understanding of the invention and to show how the same may be carried into effect, reference will now be made, by way of example, to the accompanying drawings, in which:

FIG. 4 is a sectional side view of yet another modified form of cleaning mechanism.

Figure 1:
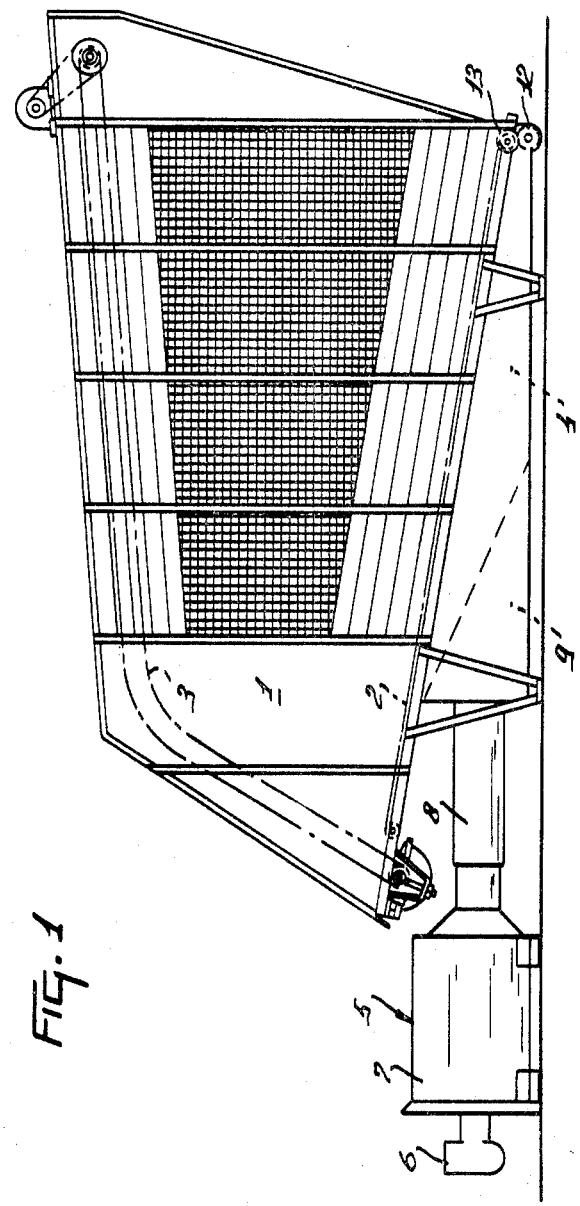
FIG. 1 is a diagrammatic side view of a crop drier.

The crop drier shown in FIG. 1 has a box-like drying space 1 provided with crop conveying mechanism including an endless conveyor 2 in the floor of the drying space 1 and a conveyor 3 provided with hook-like tines and having an inclined portion extending up the wall (termed hereinafter the rear wall) of the drying space opposite an inlet opening to the space, and a substantially horizontal portion extending forwardly from the inclined portion. The central part of each longitudinal wall of the drying space is formed for the major part by meshwork. The front wall is provided with doors through which crop can be inserted into the drying space, for example by means of a pick-up wagon.

Figure 2:
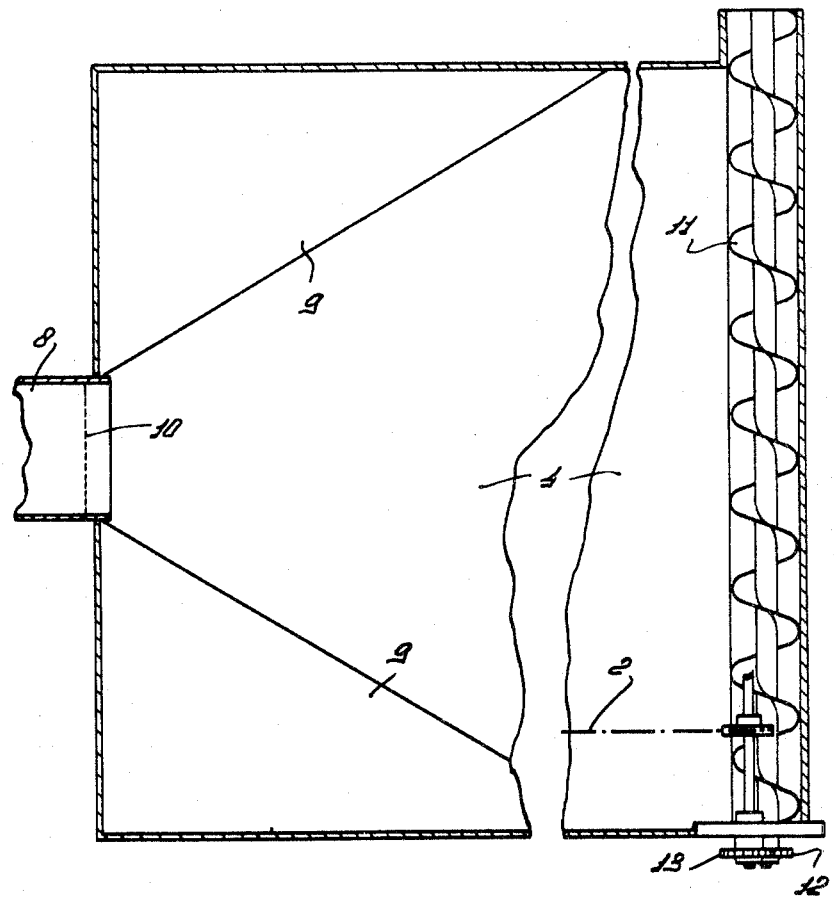
FIG. 2 is a sectional plan view on an enlarged scale of a cleaning mechanism of the drier of FIG. 1.

Beneath the drying space 1 a passage 4, rectangular in plan, is provided with insulating walls. From this passage hot air can be forced through slot-shaped openings between adjacent bars in the floor of the drying space into crop located in the drying space. Behind the passage 4 heating equipment 5 is disposed, which includes a burner 6 and a heat exchanger 7 for heating air. A blower communicates with the heat exchanger and the housing thereof opens out through a channel 8 at the rear of the passage 4 near the center of the rear wall of the drying space (FIG. 2).

From the opening of the channel 8, screening plates 9 are provided in the interior of the passage 4 so that the corners on either side of the opening are screened. The opening of the blower is covered by a fine mesh screen 10 for preventing excessively heated parts from penetrating into the passage 4.

At the front of the passage 4 an auger or worm conveyor 11 extends over the whole width of the passage, one end of this conveyor projecting out of the passage. At the other end the worm conveyor 11 is provided with a gear wheel 12 which co-operates with a gear wheel 13 on the foremost shaft of the conveyor 2 for driving the worm conveyor 11. Where the worm conveyor projects through the wall of the drying space the flights thereof provide an adequate closure so that hot air cannot escape from the passage. The conveyor opens out at that end of the passage 4 which is remote from the heating equipment 5.

The drier described above operates as follows:

By means of a pick-up wagon or the like a load of crop to be dried can be inserted through the open doors at the front of the drier into the drying space. During discharge of the pick-up wagon the conveyors 2, 3 and 13 are driven by, for example, an electric motor through transmission members (not shown). The crop unloaded from the pick-up wagon and dropping on the endless conveyor 2 in the floor of the drying space 1 is carried to the rear by this conveyor so that it passes to within reach of the hook-like tines of the conveyor 3. These hook-like tines convey the crop in small batches upwardly and after some time it drops from the tines in the manner described in our co-pending application Ser. No. 105,213 filed Jan. 11, 1971, approximately near the center of the drying space, onto the crop on the floor.

When the wagon load has thus been discharged, the doors of the drying space are closed and by actuating switching mechanisms (not shown) the place at which the crop detaches from the tines of the conveyor 3 is shifted forwards (see application Ser. No. 105,213 filed Jan. 11, 1971, so that crop accumulated at the rear can be displaced to the front. In this way a continuous movement of the crop to be dried across the space is obtained, the crop being stacked on the floor in an airy layer, while it is slowly displaced again to the rear by means of the conveyor 2.

By means of the heating equipment 5, hot air is blown, via the supply channel 8 into the passage 4, from where it penetrates into the crop through the slots between the bars which form part of the floor of the drying space.

During the drying process, while as stated above the crop is displaced in an airy layer with the aid of the conveyor 2 along the bottom of the drying space from front to rear, it cannot be avoided that dust and crop particles pass into the passage 4, where they are deposited in a layer on the bottom. This may give rise to clogging, and there is also the risk that this thoroughly dry material may be ignited by excessive heating. In order to obviate this risk the conveyor 11 is provided, with the aid of which material deposited in the passage is conducted away laterally since the air streams from the blower flowing through the passage from rear to front, act to move the deposited material to the front to accumulate and be conducted away by the conveyor 11.

Figure 3:
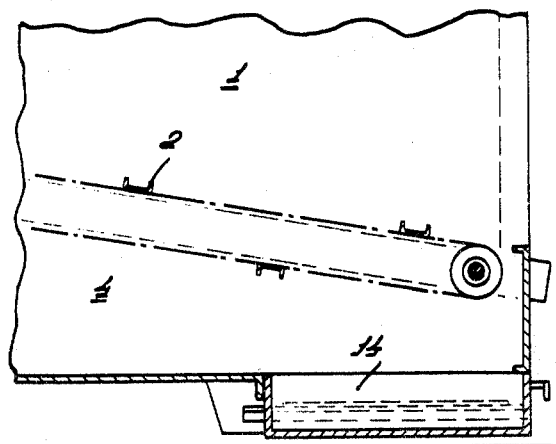
FIG. 3 is a sectional side view of a modified form of cleaning mechanism.

FIG. 3 shows a form in which the conveyor 11 is replaced by a collecting trough 14.

In the form of FIG. 4 a member 15, for example, of for instance canvas, is mounted on the bottom of the passage 4. At the rear it is connected by means of cables 15A with a winch 16. At the front a closing plate 17, fastened to the member 15, is provided with a draw ring 18. The draw ring can be connected by a cable with an electric motor or a tractor for pulling the member 15 out of the passage 4. Material lying on this member can then be removed. By means of the winch 16, which may be actuated manually or, if desired, mechanically, the member 15 can thereafter be returned to its initial position.

While various features of the machines that have been described, and that are illustrated in the drawings, will be set forth in the following claims as inventive features, it is to be noted that the invention is not necessarily limited to these features and that it encompasses all of the features that have been described and illustrated both individually and in various combinations.

Having thus described my invention, what I claim as new and desire to secure by letters patent of the United States is:

1. A crop drier comprising an enclosed drying space with an endless conveyor means mounted in said drier to move crop from the rear side of said drying space to the forward and opposite side thereof, forced air heating means located at the lower portion of said rear side to communicate drying air to an air passage within said drier, said air passage extending below said conveyor means and being positioned to allow the drying air from said heating means to rise upwardly through said drying space as well as the crop being conveyed through said space, collecting and cleaning means being located beneath said conveyor means within said dryer to receive debris from the crop being conveyed, said collecting and cleaning means being movable with respect to the remainder of the drier for the ready removal of collected debris.

2. A drier as claimed in claim 1, wherein said collecting and cleaning means is positioned adjacent the forward side of said drier and near one end of said endless conveyer means.

3. A drier as claimed in claim 2, wherein said collecting and cleaning means comprises a conveying member which extends transverse to the path of said endless conveyor means.

4. A drier as claimed in claim 3, wherein said conveying member is a worm conveyor.

5. A drier as claimed in claim 1, wherein said collecting and cleaning means is a conveying member which extends substantially over the whole width of said endless conveyor.

6. A crop drier comprising an enclosed drying space with an endless conveyer means mounted in said drier to move crop from the rear side of said drying space to the forward and opposite side thereof said endless conveyer means including a plurality of horizontally positioned conveyors that move crop through substantially the entire length of said drier, forced air heating means located at the lower portion of said rear side to communicate drying air to an air passage within said drier, said air passage extending below said conveyors and being positioned to allow the drying air from said heating means to rise upwardly through said drying space as well as the crop being conveyed through said space, collecting and cleaning means being located beneath said conveyors within said dryer to receive debris from the crop being conveyed, said collecting and cleaning means being movable with respect to th remainder of the drier for the ready removal of collected debris.

7. A drier as claimed in claim 6, wherein at least one side of the drier is screened to permit ventilation above said air passage.

* * * * *